United States Patent
Evanson

[15] 3,656,424
[45] Apr. 18, 1972

[54] MEAT INJECTION TENDERIZATION APPARATUS AND METHOD

[72] Inventor: Clifford E. Evanson, Highland Park, Ill.

[73] Assignee: Baxter Laboratories, Morton Grove, Ill.

[22] Filed: Nov. 10, 1970

[21] Appl. No.: 88,439

[52] U.S. Cl. ................................................99/256, 99/107
[51] Int. Cl. ..........................................................A23l 3/34
[58] Field of Search....................99/256, 257, 107, 254, 255; 27/21, 22, 23, 24

[56] References Cited

UNITED STATES PATENTS

| 2,490,765 | 12/1949 | Abbott | 99/257 |
| 2,520,719 | 8/1950 | Hanson | 99/256 |
| 2,670,673 | 3/1954 | Gordon | 99/257 |
| 3,232,209 | 2/1966 | Earl | 99/107 |
| 3,256,801 | 6/1966 | Greenspan | 99/107 |

Primary Examiner—Robert W. Jenkins
Attorney—Scott J. Meyer

[57] ABSTRACT

An air-powered, hand-operated meat injection tenderization unit having means for receiving enzyme solution from a storage supply and for delivering measured quantities of the enzyme solution under low pressure through a gang of hollow needles which can be injected into the meat carcass.

5 Claims, 6 Drawing Figures

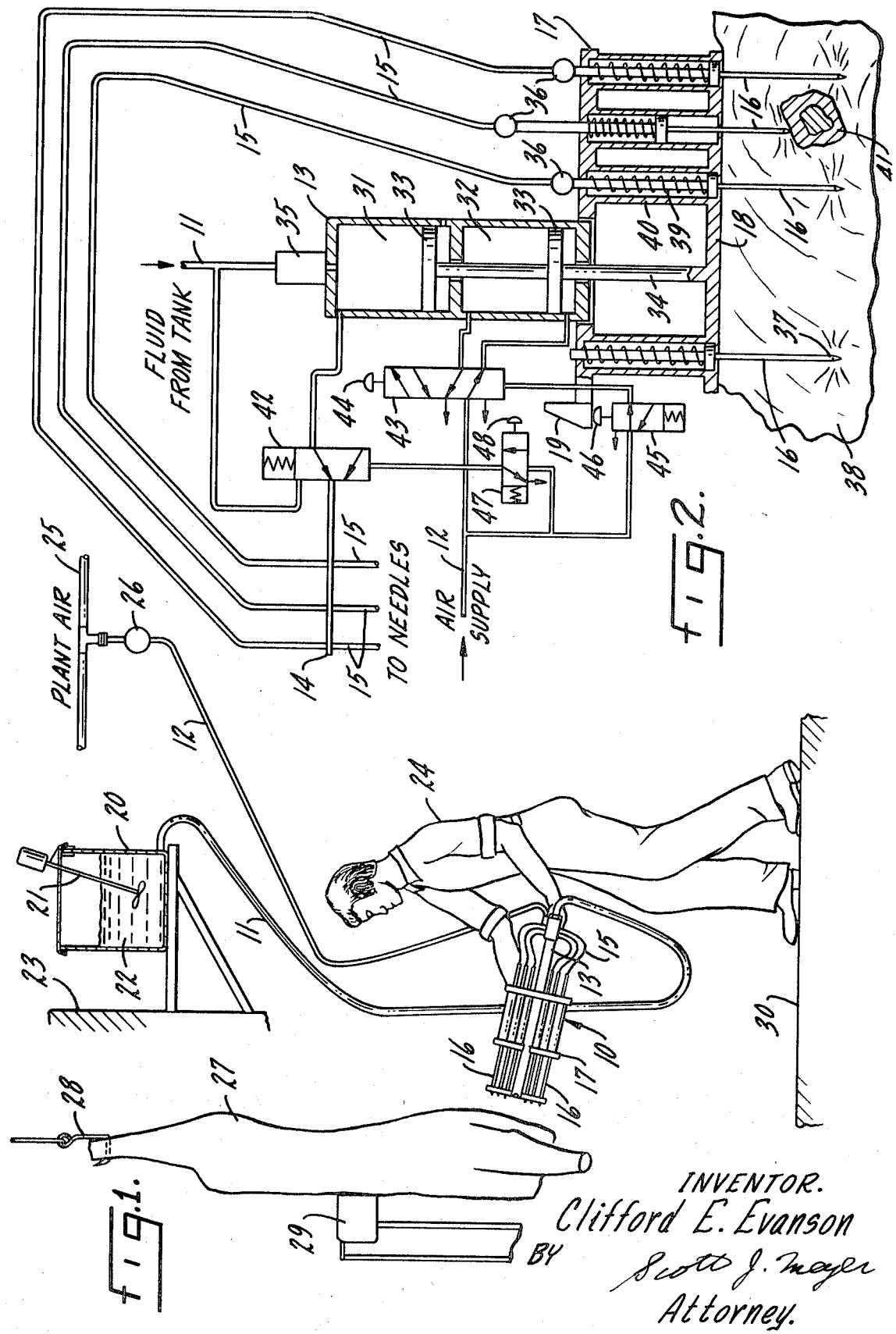

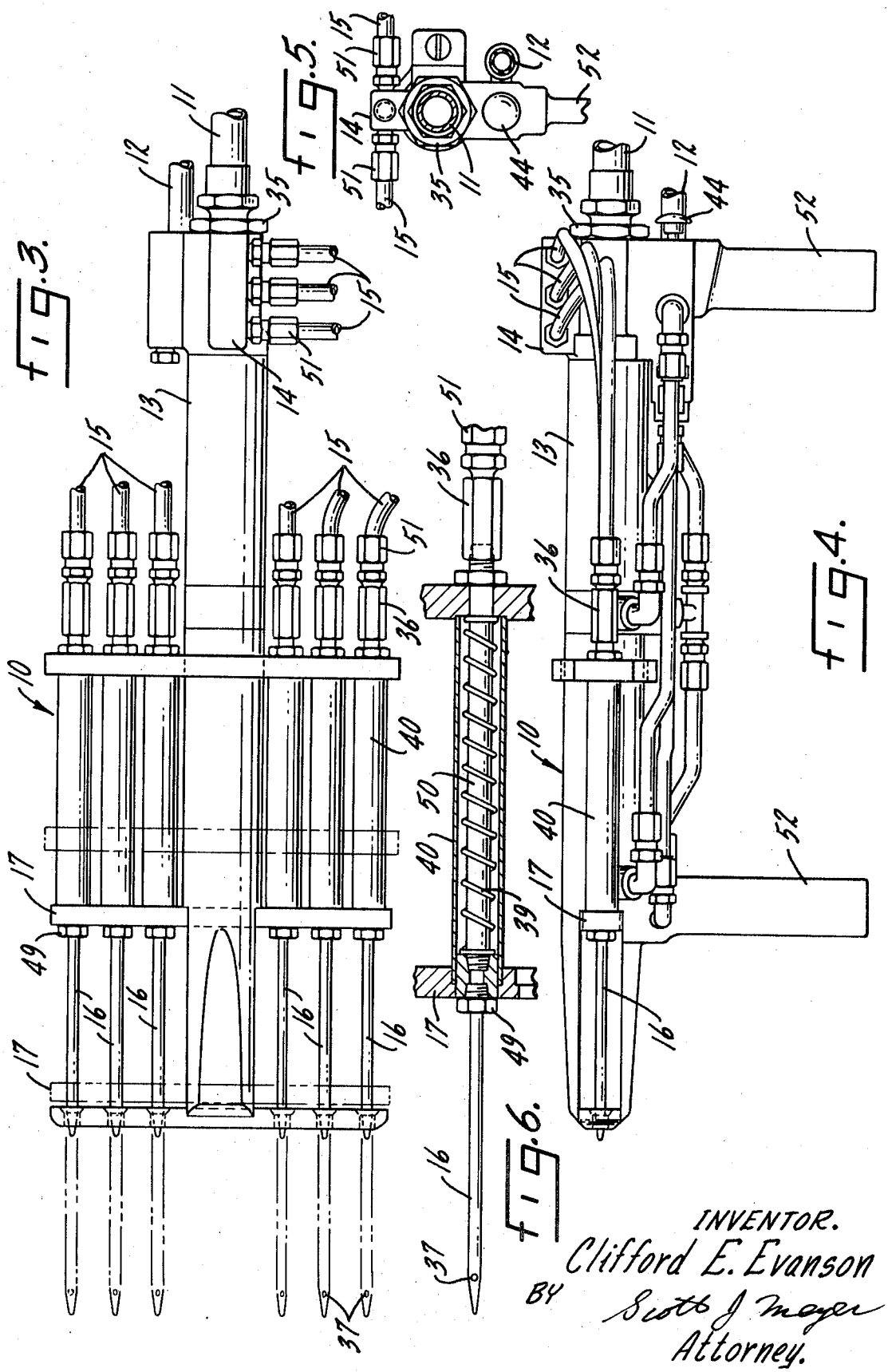

MEAT INJECTION TENDERIZATION APPARATUS AND METHOD

This invention relates to the tenderization of meat. More particularly, the present invention relates to apparatus and a method for meat injection tenderization with enzyme solutions.

It is known that meat such as beef, lamb, mutton, veal and pork can be tenderized by the injection of a solution of various plant proteolytic enzymes such as bromelain, ficin and papain, or microbial proteases such as the bacterial proteases from *Bacillus subtilis*, *Bacillus mesentericus*, *Bacillus cereus*, and the like proteolytic enzymes or enzyme preparations. According to one method of enzyme tenderization, the enzyme solution is injected into the blood vessels of the carcass. Such procedure is generally unsatisfactory since the solution is carried through the arteries and veins without any control of the distribution of the enzyme in appropriate amounts throughout the carcass. This procedure can result in overtenderization in certain meat tissues and undertenderization in other meat tissues.

In an improved method of carcass tenderization, the enzyme solution is injected intramuscularly immediately after slaughter and while the carcass is still within the body temperature range of about 96° to 110° F and prior to the onset of rigor mortis. In this method, a specific amount of enzyme solution, namely about 1 percent to 4 percent by weight of the carcass, is injected into the meat. Illustrative of such improved enzyme injection method is that described in U.S. Pat. Nos. 3,276,879 and 3,232,209.

Various types of apparatus and equipment have been described and used heretofore for meat injection tenderization. Devices such as manually operated syringes with hypodermic type needles and various hand operated pumping forks are known. These devices are generally unsatisfactory because of the numerous injections required and the nonuniform injection.

Other apparatus suitable for semi automatic injection of tenderizing solutions or of various curing liquids on a production line basis are described, for example, in U.S. Pat. Nos. 2,821,901; 3,232,209; 3,256,801; 3,334,570; 3,381,603; and 3,386,369. Most of this apparatus is suitable only for the injection of solutions in meat chops, steaks and other pieces rather than carcasses. Moreover, the equipment is complicated and costly in operation and not sufficiently flexible in use.

It is an object of this invention to provide a novel apparatus and method for meat injection tenderization with enzyme solution.

It is another object of this invention to provide improved apparatus for the selective tenderization of meat carcasses by intramuscular injection of dilute enzyme solutions employing the relatively low pressures and enzyme quantities specified in U.S. Pat. No 3,276,879.

It is yet another object of this invention to provide an air-powered, hand-operated carcass injection apparatus for automatic delivery of a controllable amount of enzyme solution through a gang of needles.

Other objects and advantages of the invention will be apparent to those skilled in the art after reading the present disclosure.

The nature and substance of the invention can be summarized briefly as comprising an air-powered, hand-operated meat injection tenderization unit having means for receiving enzyme solution from a storage supply and for delivering measured quantities of the enzyme solution under low pressure through a gang of hollow needles which can be injected into the meat carcass. The injection unit comprises a cylinder having an upper chamber for receiving enzyme solution and a lower chamber for receiving pressurized air. A piston having a piston rod is disposed within the cylinder and adapted for upward and downward motion for alternately delivering and receiving said enzyme solution. The enzyme solution is delivered from the storage supply into the cylinder and through a manifold to the needles. The piston is operated by air pressure and valving means whereby the downward movement of the piston causes enzyme solution to be drawn into the cylinder and the upward movement of the piston causes enzyme solution to be forced through the manifold and needles and into the carcass. The lower part of the piston rod is attached to a needle carrier whereby the downward movement of the piston and piston rod also causes the needles to penetrate the meat and the upward movement causes the needle to retract. Thus, enzyme solution is injected into the meat during the withdrawal of the needles from the carcass.

While the specification concludes with claims particularly pointing out and distinctly claiming the subject matter regarded as forming the present invention, it is believed that the invention will be better understood from the following description taken in connection with the accompanying drawings in which:

FIG. 1 is an elevational view of an installation on the kill floor showing a side of a beef carcass and an operator positioning the air-powered, hand-operated meat injection tenderization unit for carcass injection of enzyme solution delivered from a storage tank.

FIG. 2 is a schematic flow sheet showing the circuit of the enzyme solution from the storage tank to the meat injection site including a partial cross section of the operating mechanism of the meat injection tenderization unit at the start of the return stroke.

FIG. 3 is a plan view of the meat injection tenderization unit.

FIG. 4 is a side view of the meat injection tenderization unit.

FIG. 5 is an end view of the meat injection tenderization unit.

FIG. 6 is a view of the needle and housing assembly.

Referring now to the drawings, the apparatus is composed of an air-powered, hand-operated meat injection tenderization unit 10, which is adapted for receiving enzyme solution through line 11 and pressurized air through line 12 as illustrated in FIGS. 1 and 2. Injection unit 10 generally has a central cylinder 13 communicating with enzyme solution line 11 and pressurized air line 12. A needle manifold 14 distributes enzyme solution through a plurality of flexible tubes 15 to a corresponding plurality of hollow injection needles 16 disposed in a needle carrier 17.

As illustrated in FIG. 1, a storage tank 20 having a mixer 21 for mixing and storing enzyme solution 22 can be attached to wall 23 above operator 24 and adapted for gravity flow of fluid through line 11 to the meat injection tenderization unit 10. Alternatively, tank 20 can be positioned at any suitable location and can include fluid pumping means (not shown), if desired. Plant air under pressure is supplied at 25 through pressure regulator valve 26 adjusted to the desired pressure and thence to line 12 and meat injection tenderization unit 10.

As further illustrated in FIG. 1, operator 24 positions the air-powered, hand-operated meat injection tenderization unit 10 against the carcass 27 hanging from a hook 28 and backed by a support 29 to absorb the thrust of the injection. Operator 24 is shown standing on the kill floor 30 for injecting the lower half of the carcass 27. Injection of the upper half of the carcass 27 can be accomplished by the operator 24 climbing to the top of a fixed platform (not shown). Alternatively, operator 24 can be positioned on an elevator or lift (not shown) for upward and downward movement or another operator (not shown) can be positioned at the top of the fixed platform for injection of the upper half of carcass 27.

As illustrated in Fig. 2, the central cylinder 13 of meat injection tenderization unit 10 has an upper fluid chamber 31 for receiving enzyme solution and an adjacent lower air chamber 32 for receiving pressurized air. A piston 33 having a piston rod 34 is adapted for upward and downward motion within cylinder 13 for alternately receiving and dispensing the enzyme solution under the force of pressurized air. A rigid member 18 of needle carrier 17 having an adjustable cam 19 is affixed to piston rod 34 so that needle carrier 17 moves simultaneously and synchronously upward and downward with the corresponding motion of piston 33 and piston rod 34.

As further illustrated in FIG. 2, enzyme solution flows from line 11 through a check valve 35 disposed on cylinder 13 and thence to manifold 14 for distribution to needles 16. The enzyme solution is distributed to needles 16 through flexible tubes 15. Although only three tubes 15 are shown in FIG. 2 leading to three needles 16, the meat injection tenderization unit 10 preferably has at least six such pairs of tubes 15 and needles 16 as more generally shown in FIG. 1. Each pair of tubes 15 and needles 16 has a check valve 36 and each needle has a plurality of orifices 37 at the distal end for injecting solution into the carcass at 38, preferably about 2 to 4 orifices 37 of suitable small size positioned close to the end of each needle 16. Springs 39 are provided in housing 40 to maintain a force great enough to effect penetration of the meat tissue but small enough to permit retraction when a needle 16 strikes a bone 41.

The meat injection tenderization unit 10 is further provided with fluid and air valving mechanism as illustrated in FIG. 2. A three-way -way fluid valve 42 is disposed intermediate cylinder 13 and manifold 14 for controlling the flow of enzyme solution through manifold 14 and needles 16 and a four-way air valve 43 having an actuator button 44 is disposed intermediate cylinder 13 and air line 12 for regulating the flow of pressurized air into cylinder 13. Pilot valve 45 having an actuator button 46 is disposed intermediate air valve 43 and air line 12 Another pilot valve 47 having an actuator button 48 is disposed intermediate fluid valve 42 and air line 12.

Referring now to FIGS. 3, 4, 5 and 6 the preferred meat injection tenderization unit will generally have at least six pairs of needles 16 and corresponding needle retainers 49, conduits 50, check valves 36, tube fittings 51 and flexible tubes 15. A pair of hand grips 52 facilitates holding of the meat injection tenderization unit by operator 24. FIG. 3 shows the needles 16 and the needle carrier 17 in both the injection and retraction positions; whereas FIG. 4 shows the needles only in the retracted position.

In the operation of the apparatus and in practicing the method of the present invention, when actuator button 44 is depressed by the operator's thumb, air is directed through valve 43 into the top of chamber 32 thus pushing the piston 33 downward. The rigid member 18 connects piston rod 34 of cylinder 13 to the needle carrier 17 whereby the downward movement of the piston causes fluid to be drawn into the upper part of chamber 31 and also causes the needles 16 to penetrate the meat. This motion also lowers the cam 19 which opens air pilot valve 47 to position the three-way valve 42 so that fluid can flow to needle manifold 14.

At the end of the downward motion the needle carrier 17 strikes pilot valve 45 thereby shifting valve 43 so that air is directed into the lower end of chamber 32. This causes the piston to raise and forces the fluid from the upper portion of the chamber 31 through three-way valve 42 into needle manifold 14 and flexible tubes 15. Fluid is forced through flexible tubes 15 and check valves 36 into needles 16 and out through small orifices 37 located in needles 16 throughout the upward or return stroke. During this phase of the operation the fluid is prevented from being forced into supply line 11 by check valve 35. Similarly, check valve 36 retains the fluid in the tube 15 and manifold 14 system during the downward or suction stroke.

The volume to be delivered through needles 16 is controlled by the adjustable cam 19 which is set to shift the three-way valve 42 when the desired volume has been reached. When valve 42 is shifted, the fluid remaining in upper part of chamber 31 is diverted back into supply line 11 as the upper stroke is completed. At the end of the upward stroke, the unit is in the neutral position and ready for the next injection cycle.

Each needle is equipped with a check valve 36 to retain interrupting fluid in the needle and prevent dripping. Also, each needle 16 is spring-biased to retract relative to the motion of needle carrier 17 without interrupting the penetration of adjacent needles in the event a needle strikes bone 41 during the injection stroke. The purpose of this feature is (1) to minimize damage to the needle points and the associated cost of replacement, and (2) to avoid the need and loss of time for the operator to relocate the entire injection unit and probe for a bone-free entry.

In an example employing the apparatus and method of the present invention, four packages of Tona 300 (each package containing 11.4 oz. of papain, standardized at 2.5 M. C. units per gram) are dissolved in 40 gallons of warm water in a stainless steel mixing tank equipped with a Lightnin stirrer. As used herein, M. C. refers to Milk Clotting units as defined in U.S. Patent No. 3,276,879. A side of freshly slaughtered beef carcass having a dressed weight of 24 lbs. is then injected with this enzyme solution in twenty selected anatomical areas (rounds, loins, chuck and rib sections), for a total of 2 percent of enzyme solution based on the dressed weight of the carcass. Each injection is made with the air-powered, hand-operated meat injection tenderization unit employing a gang of six injection needles in the needle carrier and a needle injection pressure of 30 to 35 pounds per square inch. Each needle is 4 to 5 inches in length and is provided with two to four holes near the end of the needle. The weight of the carcass after injection is 249 lbs.

The foregoing described apparatus and method has several unique advantages over meat injection tenderization devices and methods heretofore employed. These features are as follows:

1. The needles are forced into the carcass by air pressure, thereby eliminating the need for manual exertion on the part of the operator.

2. The needles are also withdrawn from the carcass by air pressure.

3. The same air pressure that withdraws the needles from the carcass also forces the fluid into the carcass as the needles are withdrawn. This gives uniform distribution of the solution throughout the entire length of the injection.

4. An adjustable cam on the unit allows the operator to adjust the supply of fluid. Another control for determining the amount of fluid is to determine the number of injections in the carcass. Thus, a large carcass may have 22 injections and a smaller carcass may have less than 20.

5. The apparatus and method has the added feature of safety insofar as it does not require electrical connections and is completely air-powered. This is advantageous since kill floors are usually quite wet.

6. The invention does not require complicated and costly equipment and provides for flexibility in operation. The meat injection tenderization unit generally requires only a holding tank for enzyme fluid and a supply of air for the unit's operation. In addition, a scale would normally be provided for measuring the weight of the carcass and for determining the amount of enzyme solution to be injected in any given carcass.

While particular embodiments of the invention have been illustrated and described, it will be obvious to those having skill in the art that various changes and modifications can be made without departing from the spirit and scope of the invention. It is intended to cover in the appended claims all such changes and modifications that are within the scope of the invention.

What is claimed is:

1. Apparatus for tenderization of meat comprising an air-powered, hand-operated meat injection tenderization unit having: a manifold for receiving and dispensing enzyme solution; a manually actuated air valve for receiving and dispensing pressurized air; a cylinder having (a) an upper chamber for receiving enzyme solution from a supply source and communicating with said manifold and (b) an adjacent lower chamber for receiving said pressurized air from a supply source through said air valve; a piston disposed within said cylinder adapted for upward and downward motion for alternately receiving and dispensing said enzyme solution and said pressurized air to and from said respective chambers; a plurality of hollow injection needles each communicating with the interior of said manifold and being housed in a needle carrier having a cam and a rigid member adapted for upward and downward motion synchronous with the corresponding motion of said piston; a first valve means intermediate said manifold and said cylinder for controlling the flow of enzyme solution through said manifold; and a second valve means actuated by said cam and intermediate said air valve and the pressurized air source for alternately shifting the flow of air in the cylinder and causing upward and downward motion of said piston and said needle carrier and communicating with said first valve means for actuating the flow of enzyme solution through said first valve means.

2. The apparatus of claim 1 including a check valve intermediate said cylinder and the enzyme solution supply source.

3. The apparatus of claim 1 in which the needles are spring-biased to permit retraction when striking a bone.

4. The apparatus of claim 1 including a check valves intermediate the manifold and each needle.

5. The apparatus of claim 1 in which the second valve means comprises a a first pilot valve which opens said first valve means to allow fluid flow to said manifold at the beginning of the downward stroke of said piston and a second pilot valve which shifts said air valve to allow pressurized air to flow into the bottom of said lower chamber at the end of the downward stroke of said piston.

* * * * *